United States Patent [19]

Koch

[11] 3,714,585

[45] Jan. 30, 1973

[54] SCANNING RADIO HAVING RAPID CHANNEL SKIPPING CAPABILITY

[75] Inventor: Richard C. Koch, Englewood, Colo.

[73] Assignee: Regency Electronics, Inc., Indianapolis, Ind.

[22] Filed: Feb. 17, 1971

[21] Appl. No.: 116,201

[52] U.S. Cl. ..................325/468, 325/335, 325/464, 343/206

[51] Int. Cl. ..............................................H04b 1/32

[58] Field of Search........325/31, 332, 334, 418, 469, 325/470; 343/205, 206

[56] References Cited

UNITED STATES PATENTS

| | | | |
|---|---|---|---|
| 3,614,621 | 10/1971 | Chapman | 325/469 X |
| 3,531,724 | 9/1970 | Fathauer | 325/469 |
| 3,482,166 | 12/1969 | Gleason | 343/206 X |
| 3,497,813 | 2/1970 | Gallagher | 325/453 X |
| 3,617,895 | 11/1971 | Tomsa | 325/470 X |

*Primary Examiner*—Benedict V. Safourek
*Attorney*—Woodard, Weikart, Emhardt & Naughton

[57] ABSTRACT

Multi-frequency receiver having a local oscillator with a plurality of channel determining elements sequentially connectable to control the received frequency. A shift register controlled by a multi-speed clock is used in sequencing through the channel elements. Switches are provided for each channel to control the speed of the clock. When a channel switch is set for a high speed and as the channel determining element associated with that switch is connected to the oscillator circuit, the clock pulses rapidly again thus sequencing the receiver to the next channel determining element before the carrier sensing circuitry can lock on the channel.

15 Claims, 5 Drawing Figures

INVENTOR

Richard C. Koch

BY

Woodard, Weikart, Emhardt & Naughton

ATTORNEYS

INVENTOR
RICHARD C. KOCH
BY
Woodard, Weikart, Emhardt & Naughton
ATTORNEYS

INVENTOR
RICHARD C. KOCH
BY
Woodard Weikart Emhardt & Naughton
ATTORNEYS

SCANNING RADIO HAVING RAPID CHANNEL SKIPPING CAPABILITY

BACKGROUND OF THE INVENTION

1. Field of the Invention

A receiver for modulated carrier waves having a unique frequency selection means.

2. Description of the Prior Art

Many types of receivers are known which sequentially monitor various channels automatically, locking on a channel if a signal is present. Some of these receivers have means for eliminating some channels from the channel searching process. This has been done in the past by a switch placed to prevent oscillation of a crystal in the local oscillator circuit, preventing reception of that channel during the time allotted for sampling that channel.

When using a scanning radio to monitor two-way radio conversation, it is possible to miss the first portion of a conversation if the scanning rate is slow. While very rapid scanning rates are possible where there is an oscillator for each channel and sequencing is done among the oscillator outputs, only scanning rates of moderate speeds are possible when crystals are sequentially activated in a single oscillator circuit. This is because crystals do not begin to oscillate at full strength immediately and because of delay in squelch action. Because it is much cheaper and simpler to switch various crystals in a single oscillator, slow scanning (around 14 channels/sec.) is commonly used. In a slow scanning radio with 16 channel capabilities, if it were desired to listen to only 2 channels (both sides of a two-way radio conversation, for example) it would be necessary to switch out those 14 channels which were undesired. As much as a 1 second delay could occur between the beginning of a transmission and the first reception by the receiver. This delay can easily cause a message to be misunderstood by the chopping-off of the first part or all of a code number or an address, etc.

SUMMARY OF THE INVENTION

This invention relates to a multi-speed clock for skipping channels which would otherwise be scanned in a multi-frequency receiver having automatic monitoring of channels. This invention also relates to the use of a shift register having a stage bypass switch to skip channels in a multi-frequency receiver. The shift register is associated with an output detector which provides an input to the shift register whenever there is no output of the shift register. This permits the skipping of one or more stages by bypassing those stages completely without the risk of losing a pulse or having two pulses at once for an appreciable time.

One advantage of this invention is that time spent in scanning is not wasted on inoperative channels. This permits more frequency sampling of the operative channels thus reducing the average delay between the beginning of a transmission and the first reception by the receiver. When only two channels are being monitored on a 16 channel receiver, the maximum delay can be reduced from about 1,000 milliseconds to about 70 milliseconds for a typical prior art radio.

This invention also relates to a circuit for giving preference to certain channels so that they are always scanned first in the scanning operation which occurs after a received carrier ceases. This is a simple method which avoids the flutter which can be heard in some receivers which have a priority channel and which is caused by intermittent sampling of the priority channel. With a receiver having preferential channels, the channels can be arranged in order of descending preference from the preferred channel, thus the least preferred channel will have the least chance of being scanned. Having an order of preference can insure hearing both sides of a two frequency, two way radio conversation by making those two frequencies the two most preferred channels and by not having pauses between successive transmissions. Reception of a transmission is never interrupted, unlike the priority channel monitoring of the prior art (U.S. Pat. No. 3,497,813 to Gallagher).

DESCRIPTION OF THE PREFERRED EMBODIMENT

Figure 1:
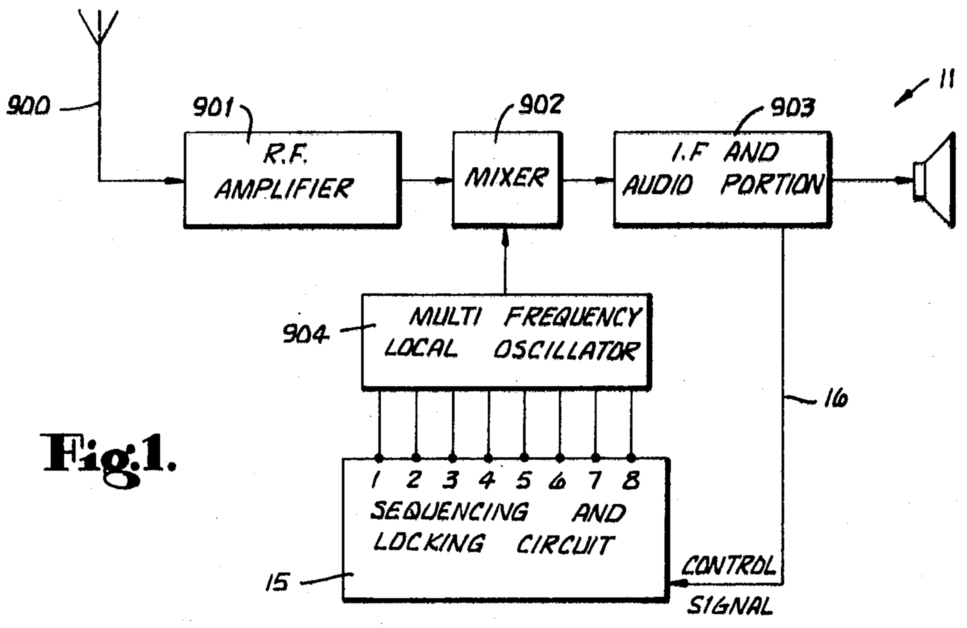
FIG. 1 is a block diagram of a scanning receiver having a sequencing and locking circuit.

Referring more particularly to FIG. 1, there is shown a block diagram of a superheterodyne scanning receiver 11. A mixer 902 is shown having one input derived from a carrier receiving means consisting of an antenna 900 and an R.F. amplifier 901. The other input of the mixer is derived from a multi-frequency local oscillator 904 which sequences among its eight frequencies in response to a sequencing and locking circuit 15. The received carrier and the local oscillator output are mixed in the mixer 902 to produce an I.F. signal which is fed to an I.F. and audio portion 903 of the radio. The I.F. and audio portion detects the presence of a carrier and produces a control signal 16 which locks the sequencing and locking circuit 15, preventing it from sequencing the local oscillator to another frequency. The patent to G. H. Fathauer, U.S. Pat. No. 3,531,724 discloses a typical radio of the prior art.

Figure 2:
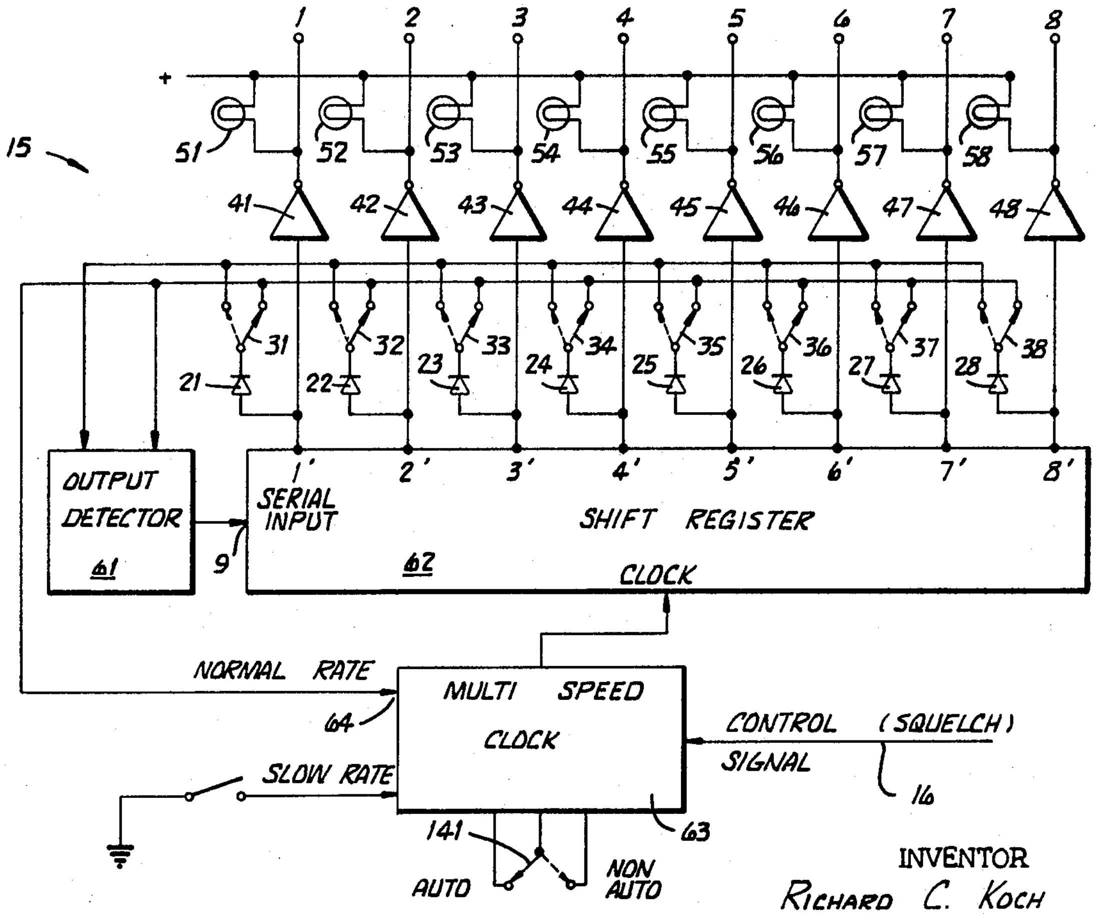
FIG. 2 is a block diagram of the sequencing and locking circuit of FIG. 1.

The sequencing and locking circuit is further illustrated in FIG. 2. A conventional shift register 62 having 8 outputs has connected to its serial input 9 an output detector 61. This output detector serves the function of putting a pulse in the input of the shift register whenever no signal is detected from any of the outputs of the shift register. Output 1′ of the shift register has a positive "on" voltage and is ground when "off." Inverting stage 41 will correspondingly have a grounded output when "on" and a positive voltage when off. This will cause lamp 51 to be illuminated during the "on" condition and off during the "off" condition. Inverting stage 41 also has its output connected to point 1 which connects to a conventional multi-frequency local oscillator to enable one of the crystals to be activated during an "on" condition. The patent to Fathauer describes a multi-frequency local oscillator in which one side of a crystal is grounded to activate it. The patent to Fry U.S. Pat. No. (2,553,366) describes a multi-frequency oscillator having diode switching which could be used.

The shift register 62 will shift the "on" condition one stage to the right for every pulse from the clock. Every stage and its associated circuitry is identical that of the first. When output 8' is "on," the next clock pulse will turn output 8' "off." Since there is no 9' output to be turned on, all of the outputs will then be off. This will cause the output detector to put a pulse in the serial input 9 of the shift register, thus at the next clock pulse, output 1' will be changed to the "on" state. It will be noted that this design eliminates the problem encountered in ring counters of two stages being in the "on" condition.

In addition to feeding inverting stages 41 to 48, the shift register outputs 1' to 8' are connected through isolating diodes 21 to 28 to channel skip switches 31 to 38. In operation, if switch 31 is in the dotted line configuration, the output voltage of output 1', if any, is applied only to the output detector. If switch 31 is in the solid line configuration, the output voltage of output 1' is applied both to the output detector and to the normal rate input 64 of the multi speed clock 63. It is apparent from the similar wiring of the remaining seven diodes and switches that the output detector will receive a voltage if any one of the 8 outputs is "on", but the multi speed clock 63 will receive a voltage only when an output is "on" and its associated switch is in the solid line configuration.

The multi speed clock has three speeds: Fast rate (about 900 pulses per second); Normal rate (about 16 pulses per second); and Slow rate (about 1 pulse per second). Unless a positive voltage is present at the normal rate input 64, the clock will run at the fast rate. If a positive voltage is present at the normal rate input, the clock can run at either the normal rate (in the auto mode) or at a slow rate (in the non-auto mode). In the auto mode the clock will not run in the presence of a control signal (squelch). In the absence of such a control signal, and with switch 141 in Auto position, the clock will run at fast rate for those channels having their associated switches in the dotted line configuration and at normal rate for those channels having their associated switches in the solid line configuration.

The effect of this circuitry is that when a channel skip switch (31–38) is in a dotted line position, the clock runs at such a fast rate that the channel is skipped. Although the associated channel element of the multi-frequency local oscillator is connected in an operational configuration and voltage is applied to the associated light, the clock pulses again so quickly that the oscillator and control circuitry does not have time to respond to a signal on that channel and the light does not have time to attain a significant brightness. If only two of the eight switches are in the solid line configuration, it will appear as though the receiver is only sequencing between the two channels. The lights for those two channels will appear to alternate back and forth between the two channels, the remaining lights will glow dimly. Reception of and locking to a carrier is only possible on the two channels.

Although the multi-speed clock is illustrated with a shift register, it could just as easily be used with a circuit such as is used by Fathauer (a 4 × 2 transistor matrix) or with a diode matrix fed by binary counters or with any other equivalent to a high speed stepping switch.

Figure 3:
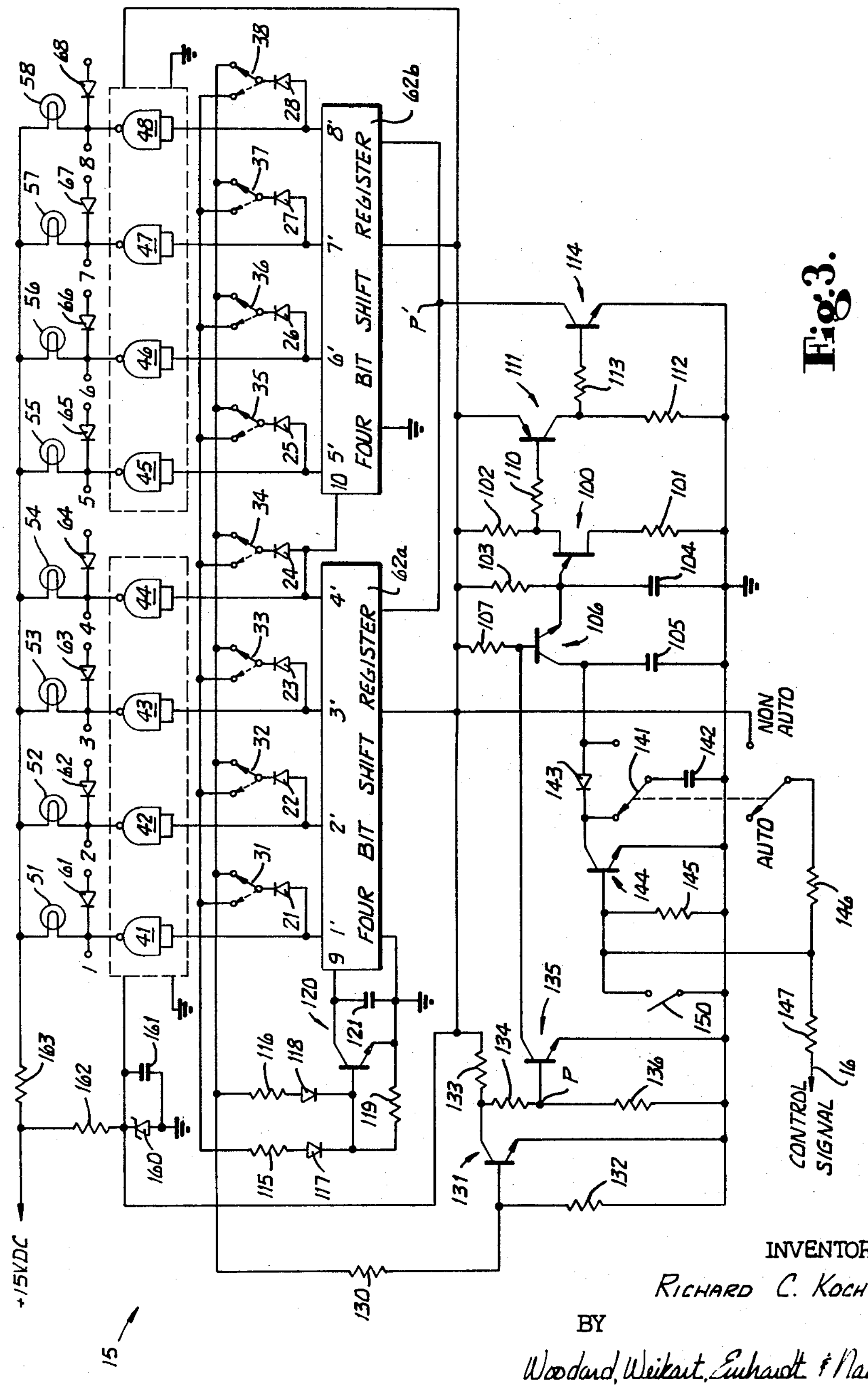
FIG. 3 is a detailed circuit diagram of the circuit of FIG. 2.
Figure 4:
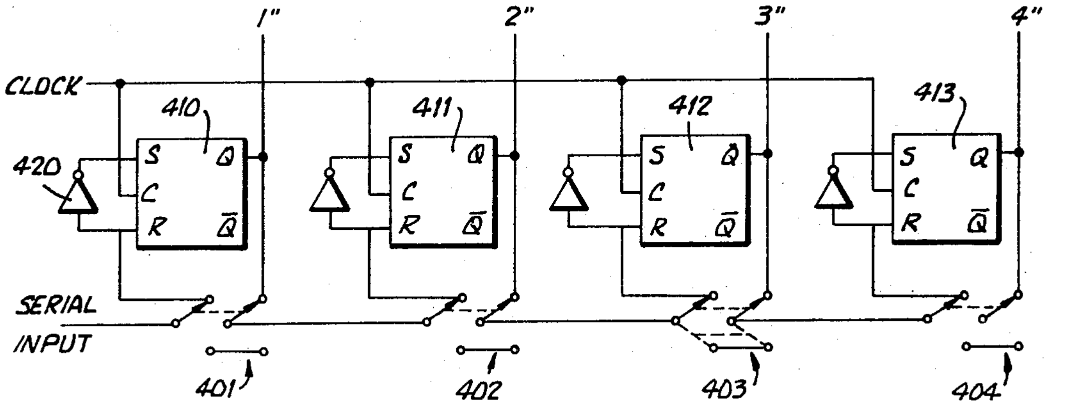
FIG. 4 is a detailed circuit diagram of a shift register having the capacity to switch out and bypass stages completely.

A similar effect to that produced by the multi-speed clock can be achieved by the use of a shift register having switches connected as illustrated in FIG. 4. The switches (401–404) are positioned for operation of the shift register in a conventional manner and such a shift register could be used in the circuits of FIGS. 1, 2 and 3. Assuming that the channel skip switches (31–38) are all in the solid line position and that the clock runs at normal speed, the shift register of FIG. 4 used in the sequencing and locking circuits of FIGS. 1, 2 and 3 would allow rapid channel skipping without varying the clock speed.

The shift register of FIG. 4 is of conventional design and it is preferred that an integrated circuit be used, such as M C 7495 P manufactured by Motorola, Inc., Franklin Park, Ill. When the switches (401–404) are in the solid line position every stage is scanned. When switch 403 is in the dotted line configuration, the input to stage 412 is disconnected, and thus that stage can never be turned on. The output from the previous stage 411 by-pásses stage 412 through switch 403 to stage 413. Thus no time at all is lost in bypassing a stage. Any number or combination of stages may be bypassed with this system.

Referring to FIG. 3, which is a detailed circuit of FIG. 2, the nature of the output detector is clearly illustrated. The positive voltage of an "on" shift register output (1'–8') passes through its associated diode (21–28) and switch (31–38) to either resistor 115 or 116. Diodes 117 and 118 allow a positive voltage to thus be applied to the base of transistor 120, causing the transistor to conduct. With the serial input 9 of the shift register near ground potential, output 1' will not be turned on by clock pulses. When none of the outputs (1'–8') are positive, transistor 120 will not be biased to conduct and the input 9 will not be grounded. The shift register used is an M C 7495 P, and such a shift register does not need external pull-up resistors to cause its inputs to become positive. A capacitor 121 is added to delay the action of the output detector so that it does not respond to momentary losses of output which may occur from normal shifting from one stage to the next and to prevent the turning "on" of output 1' from turning off the input 9 before the clock pulse ends.

The clock pulse is generated by a unijunction transistor 100. At fast rate, capacitor 104 (0.015 $\mu$f) charges through resistor 103 (47,000 ohms) until a voltage is reached which will fire the transistor 100. When that voltage is reached, the capacitor rapidly discharges through resistor 101 (100 ohms). A resulting output pulse is developed across resistor 102 (390 ohms) and is amplified and shaped by transistors 111 and 114 and their associated biasing resistors 110, 112, and 113. At point P' of the clock line, a positive voltage exists except during the clock pulses, when transistor 114 shorts the clock line to ground.

To prevent the clock from operating at a fast rate, a shift register output (1'–8') must be "on" and connected to resistor 130 by having the switch (31–38) associated with such output being in the solid line position. A positive voltage on resistor 130 will cause transistor 131 to conduct, which will cause its collector to be near ground potential due to dropping resistor 133 from the 5.1 volt zener 160 regulated power supply. With the collector of transistor 131 near ground potential, the base of transistor 135 will be nearer ground potential and thus cut off. With transistor 135 cut off, transistor 106 will be biased to conduct. This will cause capacitor 105 (2.2 $\mu$f) to be placed in parallel with capacitor 104, thus the speed of the clock will be considerably slower.

It should be noted that when transistor 106 is biased to conduct and the oscillator is operating, the current flows from emitter to collector during the slow charging and from collector to emitter during the rapid pulse forming discharge. If no positive voltage is present at resistor 130, the result will be that the base of transistor 106 will be shorted to ground by transistor 135. This will cause the unijunction transistor 100 to operate at a fast rate, because transistor 106 will be non-conducting and preventing capacitor 105 from affecting the speed of the clock.

The control signal is of conventional type and is sometimes described as a squelch or muting signal. It is positive when a carrier is detected and otherwise ground. When a carrier is detected the positive voltage of the control signal is applied through resistor 147 to the base of transistor 144 and biasing resistor 145. Transistor 144 then conducts and through diode 143 prevents voltage from building up on capacitors 105 and 104. This prevents oscillation of the unijunction transistor 100 and the receiver will remain on channel until the control signal goes to ground potential (which occurs when the received carrier ceases).

At this time transistor 144 will become non-conducting and capacitors 104, 105 and 142 (8 $\mu$fd) will begin to charge. After the firing voltage of the unijunction is reached, capacitors 104 and 105 will discharge as indicated earlier. Diode 143 prevents the discharge of capacitor 142 through the unijunction. The purpose of capacitor 142, as switched, being merely to delay the occurrence of the initial clock pulse after a received signal ceases. This allows the receiver to respond to a delayed responding transmission on the same channel. Switch 150 can be closed to cause scanning to resume even if a signal is being received. Ideally, the short time length of fast-rate connection of a channel element will be less than 20 percent of the normal time length of a normal-rate connection so that scanning time will be efficiently used.

The description to this point has presumed operation in the "auto" mode, with switch 141 in the illustrated position. If switch 141 is placed in the "non-auto" mode, the 5.1 volt regulated voltage is applied through resistor 146 to cause transistor 144 to conduct regardless of the control signal voltage. This will prevent operation of the clock in the manner previously described. To operate the clock, switch 150 can be closed grounding the base of transistor 144. With transistor 144 not conducting, capacitors 104, 105 and 142 will charge and the unijunction will eventually fire. The speed of the clock in this mode, however, will be slow due to the fact that switch 141 places the capacitor 142 on the other side of diode 143. It should be noted that even in this mode of operation, rapid channel skipping still occurs for those channels which have their channel skip switches (31–38) in the dotted line position. Transistor 106 will still control whether or not the additional capacitance is connected in the circuit with capacitor 104.

Figure 5:
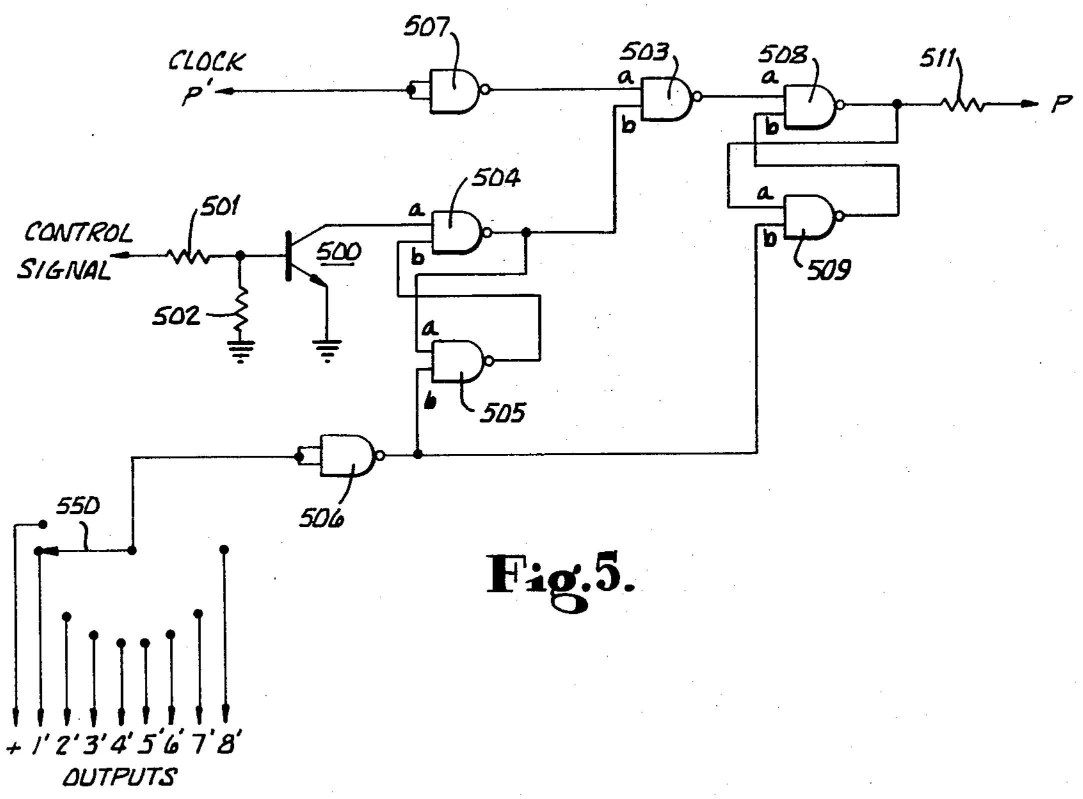
FIG. 5 is a diagram of a circuit which can be added to the circuit of FIG. 3 to give preference to certain channels.

In FIG. 5 there is illustrated a circuit for giving preference to certain channels. This circuit can be directly added to the circuit of FIG. 3. The effect of the circuit is to cause the channel scanning to always begin at a selected channel after a received carrier wave ceases. The circuit uses TTL NAND gates, preferably Motorola MC 7400 P integrated circuit, whereas DTL power NAND gates such as Motorola M C 858 P are used as inverting amplifiers 41–48 in FIG. 3.

During normal scanning, input a of a gate 504 is positive due to the inverting of the control signal by transistor 500 and its associated resistors 501 and 502. Input *b* of gate 505 alternates between positive and ground, being ground when the preferred channel is scanned (due to the inverting of gate 506). Switch 550 can select among any one of the shift register outputs to make any one the outputs preferred. A positive voltage can also be selected to defeat the operation of the circuit of FIG. 5. The output of gate 504 will be ground and the output of 505 will be positive.

Similarly, input *a* of gate 508 is positive, because input *b* of gate 503 is ground, and input *b* of gate 509 will alternate between positive and ground; thus the output of gate 508 will be ground. Resistor 135 connects the output of gate 508 to the base of transistor 135 (FIG. 3) at point P. When the output of gate 508 is ground, transistor 135 operates normally. When the output of gate 508 is positive, transistor 135 is biased to conduct and the clock is caused to run at a fast rate.

When a signal is received, the control signal goes positive, causing input *a* of gate 504 to be grounded, thus reversing the outputs of gates 504 and 505. Input a of gate 503 will be ground because the clock will be stopped, thus the output of gate 503 will remain positive and the output of gate 508 will remain ground. Assuming that the signal was not being received on the selected channel, when the positive control signal ceases the output of gate 504 remains positive. When the first clock pulse occurs, both inputs to gate 503 will be positive, thus causing the input *a* of gate 508 to be ground. This causes the output of gate 508 to be positive, resulting in operation of the clock at fast rate.

When the preferred channel is reached, the *b* inputs of gates 505 and 509 are grounded, thus causing the outputs of gates 504 and 508 to become grounded. This allows transistor 135 to function normally again. Of course, if the preferred channel has its channel skip switch (31–38) in the dotted line position, the clock will continue to operate at fast rate until a channel is reached which has its channel skip switch in the solid line position. It is clear from the operation of the circuit that not only is the specific channel selected given preference, but each succeeding channel has a lesser chance of being scanned. For example, if the channels are arranged in order of decreasing preference from the preferred channel 1, the receiver will always choose a more desired channel over a less desired channel if carriers are present on both when scanning is resumed following reception of a carrier wave on a third channel.

While it has been stated that the fast clock is faster than the response time of the local oscillator and control signal circuit, it is not necessary for this to be the case because the control signal cannot stop the clock unless the shift register output which is "on" has its switch in the solid line position. Clearly, this clock circuit could be used when switching among a plurality of local oscillators as well as when switching among crystals in a multi-frequency oscillators.

I claim:

1. A multi-frequency scanning receiver of the superheterodyne type comprising:

a. local oscillator means having several channel elements for providing local oscillations of frequencies corresponding to different channels, b. sequencing means coupled to said channel elements and including means for connecting said channel elements in turn in an operational configuration in the local oscillator means, c. a mixer coupled to said local oscillator means for mixing received carrier waves with the local oscillations provided by the connected channel element, d. detector means coupled to said mixer for producing a control signal from the output thereof in response to the reception of a carrier wave on the channel element, e. locking means coupling said detector means to said sequencing means for causing the same to hold a connected channel element in such operational configuration in response to said control signal, f. said sequencing means including means for skipping channels which includes several manual switches, each of said switches being associated with a different channel element, said means for skipping also including means responsive to said manual switches for selecting between short or normal the time during which each associated channel element will be connected in an operational configuration and, g. a plurality of electrically energizable visual indicators each connected with a different output of said sequencing means.

2. The receiver of claim 1 in which each channel element has one of said manual switches associated with it whereby any combination of short and normal times can be obtained during the scanning process.

3. The receiver of claim 1 in which said short time length is less than 20 percent of the normal time length whereby the time spent scanning will be efficiently used.

4. The receiver of claim 3 in which said channel elements are crystals.

5. The receiver of claim 4 in which said means for skipping channels includes one of said manual switches for each channel.

6. The receiver of claim 4 in which said sequencing means includes a shift register having one output for each channel and one input.

7. The receiver of claim 6 in which said sequencing means includes an output detector coupled to the shift register outputs to ground the input of the shift register if any one of the outputs of the shift register is on.

8. A multi-frequency scanning receiver of the superheterodyne type comprising:

a. local oscillator means having several channel elements for providing local oscillations of frequencies corresponding to different channels, b. sequencing means coupled to said channel elements and including a shift register having an input, said shift register for connecting said channel elements in turn in an operational configuration in said local oscillator means, c. a mixer coupled to said local oscillator means for mixing received carrier waves with the local oscillations provided by the connected channel element, d. detector means coupled to said mixer for producing a control signal from the output thereof in response to the reception of a carrier wave on the channel corresponding to the connected channel element, e. locking means coupling said detector means to said actuating means for causing the same to hold a connected channel element in such operational configuration in response to said control signal, f. said sequencing means including an output detecting means coupled to said shift register for preventing an input to the shift register if any channel elements are connected in an operational configuration in said local oscillator means and for creating an input to the shift register if none of said channel elements are connected in such operational configuration, g. said shift register having a switch connected to it to by-pass one or more stages and, h. a plurality of electrically energizable visual indicators each connected with a different output of said sequencing means.

9. The receiver of claim 10 in which each stage of said shift register has a switch connected to it whereby any number and combination of stages may be bypassed.

10. A multi-frequency scanning receiver of the superheterodyne type comprising:

a. local oscillator means having several channel elements for providing local oscillations of frequencies corresponding to different channels;

b. sequencing means coupled to said channel elements for connecting said channel elements in turn in an operational configuration in the local oscillator means;

c. a mixer coupled to said local oscillator means for mixing received carrier waves with the local oscillations provided by the connected channel elements;

d. detector means coupled to said mixer for producing a control signal from the output thereof in response to the reception of a carrier wave on the channel corresponding to the connected channel element;

e. locking means coupling said detector means to said sequencing means for holding a connected channel element in such operational configuration in response to said control signal and essentially only during said control signal's presence;

f. means connected to said locking means for resuming effective operation of the receiver at a specific channel after each time that the locking means holds a connected channel element.

11. The receiver of claim 10 in which said means for resuming includes switch means for selecting said specific channel from among a plurality of channels.

12. The receiver of claim 10 in which the resuming means may be disabled.

13. A multi-frequency scanning receiver of the superheterodyne type which uses a multi-speed clock in sequencing among frequencies which comprises:

a. local oscillator means having several channel elements for providing local oscillations of frequencies corresponding to different channels;

b. sequencing means coupled to said channel elements for connecting said channel elements in turn in an operational configuration in the local oscillator means;

c. a mixer coupled to said local oscillator means for mixing received carrier waves with local oscillations provided by the connected channel element;

d. detector means coupled to said mixer for producing a control signal from the output thereof in response to the reception of a carrier wave on the channel corresponding to the connected channel element;

e. locking means coupling said detector means to said sequencing means for holding a connected channel element in such operational configuration in response to said control signal;

f. said sequencing means including an oscillator circuit whose frequency of oscillation is determined in part by a first capacitor having a first and second lead;

g. a second capacitor having a first and second lead h. a switching transistor having its emitter connected to the first lead of one capacitor and its collector connected to the first lead of the other, the second lead of each capacitor being connected together.

i. control means for either grounding or applying voltage to the base of said transistor whereby if the base is grounded the transistor is non-conductive and if voltage is applied the transistor is conductive and the two capacitors are effectively connected in parallel.

14. The receiver of claim 13 in which the first lead of the first capacitor also connects to the emitter of a unijunction transistor.

15. The receiver of claim 14 in which the second lead of both capacitors is grounded, one base of the unijunction transistor connects through a resistor to ground and the other base connects through a resistor to supply voltage, the emitter of the unijunction transistor connects to the supply voltage through a resistor, and the base of the switching transistor connects to the supply voltage through a resistor.

* * * * *

UNITED STATES PATENT OFFICE

CERTIFICATE OF CORRECTION

Patent No. 3,714,585 Dated January 30, 1973

Inventor(s) Richard C. Koch

It is certified that error appears in the above-identified patent and that said Letters Patent are hereby corrected as shown below:

In column 7, line 9, after the word "multi-frequency", please delete the --s-- from "oscillators".

In column 7, line 27, before "channel element", please insert --channel corresponding to the connected--.

Signed and sealed this 24th day of December 1974.

(SEAL)
Attest;

McCOY M. GIBSON JR.
Attesting Officer

C. MARSHALL DANN
Commissioner of Patents